US008564992B2

(12) United States Patent
Takahashi et al.

(10) Patent No.: US 8,564,992 B2
(45) Date of Patent: Oct. 22, 2013

(54) POWER FACTOR CORRECTION DEVICE AND METHOD WITH OFF TIME PREDICTION FOR CRITICAL MODE OPERATION

(75) Inventors: Fumikazu Takahashi, Hitachi (JP); Masahiro Hamaogi, Odawara (JP); Yen-Shin Lai, Sijhih (TW)

(73) Assignee: Hitachi Information & Telecommunication Engineering, Ltd., Kanagawa (JP)

( * ) Notice: Subject to any disclaimer, the term of this patent is extended or adjusted under 35 U.S.C. 154(b) by 348 days.

(21) Appl. No.: 12/910,318

(22) Filed: Oct. 22, 2010

(65) Prior Publication Data

US 2011/0096576 A1 Apr. 28, 2011

(30) Foreign Application Priority Data

Oct. 26, 2009 (JP) ................................ 2009-245915

(51) Int. Cl.
*G05F 1/70* (2006.01)
(52) U.S. Cl.
USPC .......................................... 363/89; 323/222
(58) Field of Classification Search
USPC ..................... 323/207, 222; 363/89
See application file for complete search history.

(56) References Cited

U.S. PATENT DOCUMENTS 6,320,772 B1 * 11/2001 Doyama et al. ................. 363/89
7,317,625 B2 * 1/2008 Zhang et al. ..................... 363/89
8,111,050 B2 * 2/2012 Sutardja et al. ................ 323/207
8,344,707 B2 * 1/2013 Melanson et al. ............. 323/222
2005/0270813 A1 12/2005 Zhang et al.

(Continued)

FOREIGN PATENT DOCUMENTS

JP 2002359977 12/2002
JP 2007-288892 11/2007

(Continued)

OTHER PUBLICATIONS

Chen et al, "Predictive digital current programmed control", Jan. 2003, IEEE transactions on power electronics, vol. 18, No. 1, pp. 411-419.*

(Continued)

*Primary Examiner* — Jeffrey Sterrett
(74) *Attorney, Agent, or Firm* — Brundidge & Stanger, P.C.

(57) ABSTRACT

Proposed are a power factor correction device and its control method capable of obtaining a stable output as the output of a power supply unit while simplifying and miniaturizing the configuration. In the power factor correction device and the control method thereof including a coil and a switching element, and a control unit for controlling ON/OFF of the switching element, provided are an input voltage detection unit for detecting an input voltage of the power factor correction device, an output voltage detection unit for detecting an output voltage, and a coil current detection unit for detecting a coil current that is generated in the coil pursuant to the ON/OFF operation of the switching element. The control unit predicts an OFF time of the switching element of each switching cycle for controlling the switching element in a critical mode based on a voltage value of the input voltage detected with the input voltage detection unit, a voltage value of the output voltage detected with the output voltage detection unit, and a current value of the coil current detected with the coil current detection unit, and controls the ON/OFF of the switching element based on the prediction result.

6 Claims, 14 Drawing Sheets

(56) References Cited

U.S. PATENT DOCUMENTS

| | | | |
|---|---|---|---|
| 2008/0290846 A1* | 11/2008 | Kanouda et al. | 323/222 |
| 2009/0230899 A1 | 9/2009 | Arimura et al. | |
| 2011/0095733 A1* | 4/2011 | Park et al. | 323/207 |
| 2011/0096576 A1* | 4/2011 | Takahashi et al. | 363/44 |

FOREIGN PATENT DOCUMENTS

| | | |
|---|---|---|
| JP | 2009219299 | 9/2009 |
| TW | 200737676 | 10/2007 |
| TW | 200818682 | 4/2008 |
| TW | 200843311 | 11/2008 |
| TW | M346217 | 12/2008 |

OTHER PUBLICATIONS

Japanese Office Action mailed Nov. 29, 2011 in corresponding Japanese Patent Application No. 2009-245915 with English language translation.

Taiwanese Office Action issued Jun. 3, 2013 in corresponding Taiwanese Patent Application No. 099136533.

* cited by examiner

POWER FACTOR CORRECTION DEVICE AND METHOD WITH OFF TIME PREDICTION FOR CRITICAL MODE OPERATION

CROSS REFERENCES

This application relates to and claims priority from Japanese Patent Application No. 2009-245915, filed on Oct. 26, 2009, the entire disclosure of which is incorporated herein by reference.

BACKGROUND

The present invention relates to a power factor correction device and its control method and, for example, can be suitably applied to a switching power supply unit of an AC/DC converter or the like.

Conventionally, as a power supply unit, broadly used is a type with a power factor collection circuit (hereinafter referred to as the "PFC (Power Factor Correction) circuit") configured from a choke coil, a switching element and a capacitor disposed at the subsequent stage of a full wave rectification circuit for outputting an absolute value of a commercial AC (refer to Japanese Patent Application Publication No. 2007-288892).

This type of PFC circuit generates a triangle wavelike coil current in the choke coil by subjecting the switching element to ON/OFF operation at a high frequency, performs rectification smoothing to the coil current with a capacitor, corrects the input current to a sine wave of the same phase as the input voltage, and thereby outputs the same.

SUMMARY

Meanwhile, as an operation mode of the foregoing PFC circuit, there is a critical mode of controlling the ON/OFF of the switching element so that the coil current becomes "0" ampere for each repetition period of the ON/OFF operation of the switching element (this is hereinafter referred to as the "switching cycle").

When the PFC circuit is operated in the critical mode, since a zero current detection circuit for detecting the timing that the coil current becomes "0" ampere is required, the circuit size must be enlarged by just that much, and there were problems in terms of high cost.

Moreover, the precision of the zero current detection circuit differs based on each product, and it is difficult to accurately detecting the timing that the coil current becomes "0" ampere. If it is not possible to perform control so that the coil current accurately becomes "0" ampere for each switching cycle; the operation of the PFC circuit becomes unstable, and, consequently, there is a problem in that the output of the power supply unit becomes unstable.

The present invention was devised in view of the foregoing points. Thus, an object of this invention is to propose a power factor correction device and its control method capable of obtaining a stable output as the output of a power supply unit while simplifying and miniaturizing the configuration.

In order to achieve the foregoing object, the present invention provides a power factor correction device including a coil and a switching element, and a control unit for controlling ON/OFF of the switching element. This power factor correction device comprises an input voltage detection unit for detecting an input voltage of the power factor correction device, an output voltage detection unit for detecting an output voltage, and a coil current detection unit for detecting a coil current that is generated in the coil pursuant to the ON/OFF operation of the switching element. The control unit predicts an OFF time of the switching element of each switching cycle for controlling the switching element in a critical mode based on a voltage value of the input voltage detected with the input voltage detection unit, a voltage value of the output voltage detected with the output voltage detection unit, and a current value of the coil current detected with the coil current detection unit, and controls the ON/OFF of the switching element based on the prediction result.

Moreover, the present invention additionally provides a control method of a power factor correction device including a coil and a switching element, and a control unit for controlling ON/OFF of the switching element. The power factor correction device comprises an input voltage detection unit for detecting an input voltage of the power factor correction device, an output voltage detection unit for detecting an output voltage, and a coil current detection unit for detecting a coil current that is generated in the coil pursuant to the ON/OFF operation of the switching element. The control method comprises a first step of the control unit predicting an OFF time of the switching element of each switching cycle for controlling the switching element in a critical mode based on a voltage value of the input voltage detected with the input voltage detection unit, a voltage value of the output voltage detected with the output voltage detection unit, and a current value of the coil current detected with the coil current detection unit, and a second step of the control unit controlling the ON/OFF of the switching element based on the prediction result.

According to the present invention, since it is possible to perform power factor correction control with a critical mode without requiring a zero current detection circuit for detecting the zero point of the coil current during the switching, the power factor correction device can be downsized and, consequently, the configuration of the overall power supply unit using the power factor correction device can be simplified and miniaturized.

Moreover, according to the present invention, since the power factor correction device can be operated stably, a stable output can be obtained since the oscillation of the output voltage of the power factor correction device can be suppressed.

Consequently, the present invention is able to realize a power factor correction device and its control method capable of obtaining a stable output as the output of a power supply unit while simplifying and miniaturizing the configuration.

DETAILED DESCRIPTION

An embodiment of the present invention is now explained with reference to the attached drawings.

Figure 1:
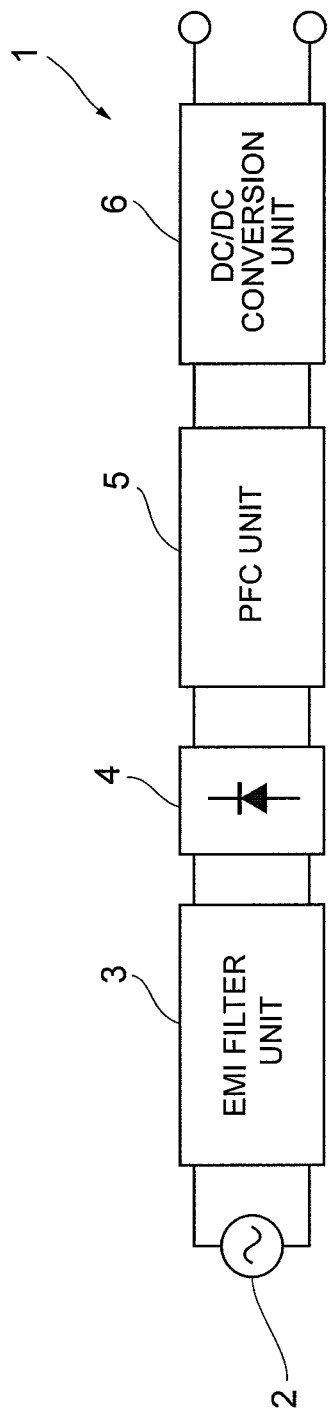
FIG. 1 is a block diagram showing a schematic configuration of the power supply unit according to an embodiment of the present invention.

(1) First Embodiment (1-1) Configuration of Power Supply Unit of Present Embodiment FIG. 1 shows the overall power supply unit 1 according to this embodiment. The power supply unit 1 comprises an EMI (ElectroMagnetic Interference) filter unit 3, a full wave rectification unit 4, a PFC unit 5, and a DC/DC conversion unit 6.

Figure 2:
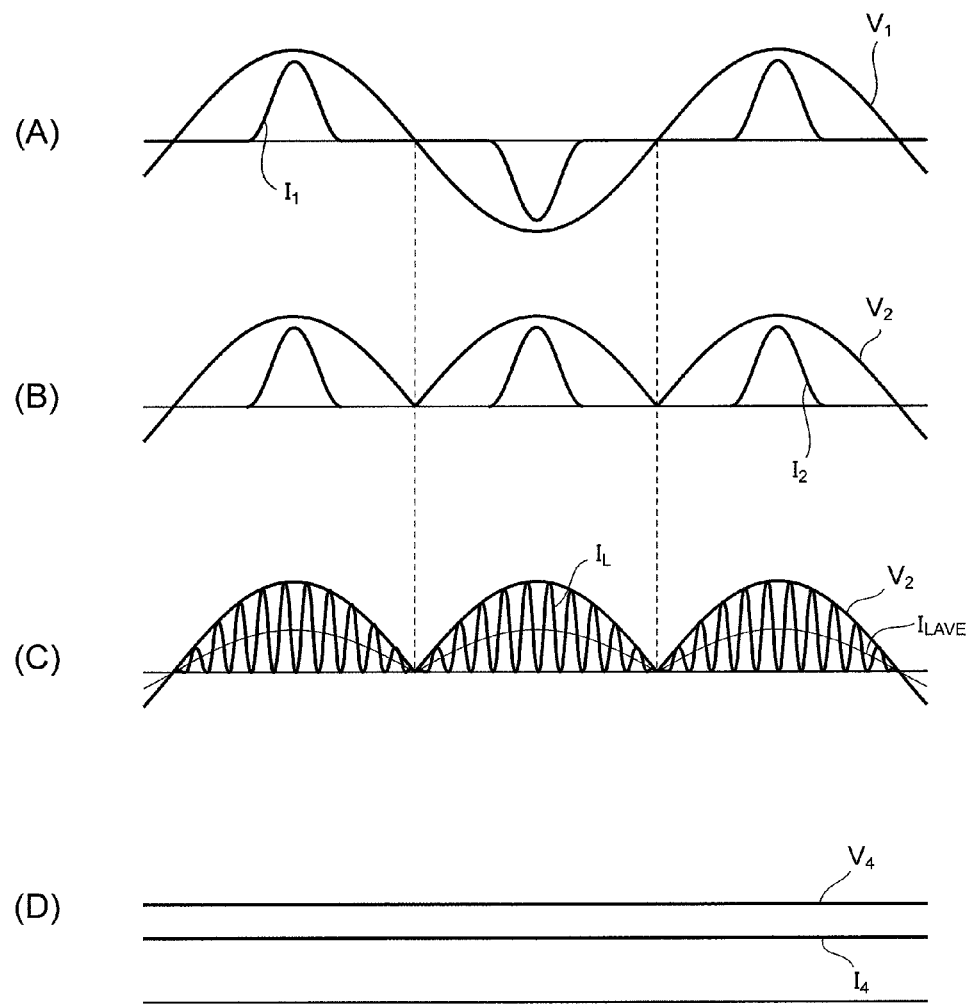
FIG. 2 is a waveform diagram showing the voltage waveform and current waveform in the power supply unit according to an embodiment of the present invention.

The EMI filter unit 3 eliminates noise from the AC source voltage $V_1$ and AC source current $I_1$ as shown in FIG. 2(A) which are provided from a commercial AC source 2. Moreover, the full wave rectification unit 4 is configured, for example, from a diode bridge, performs full wave rectification to the AC source voltage $V_1$ and AC source current $I_1$, from which noise has been eliminated, which are provided from the EMI filter unit 3, and outputs the thus obtained input voltage $V_2$ and input current $I_2$ as shown in FIG. 2(B) to the PFC unit 5.

The PFC unit 5 controls the input cycle of the input current $I_2$ throughout the entire interval so that the average value $I_{LAVE}$ of the input current $I_2$ provided from the full wave rectification unit 4 becomes a sine wave as shown in FIG. 2(C), and corrects the phase shifting between the input voltage $V_2$ and the input current $I_2$. Moreover, the PFC unit 5 smoothes the input voltage $V_2$ and input current $I_2$ in which the phase shifting has been corrected, and outputs the thus obtained output voltage $V_4$ and output current $I_4$ as shown in FIG. 2(D) to the DC/DC conversion unit 6.

The DC/DC conversion unit 6 converts the output voltage $V_4$ provided from the PFC unit 5 into an intended DC voltage, and outputs the thus obtained DC voltage of a predetermined level to the power supply destination (load).

(1-2) Configuration of PFC Unit

Figure 3:
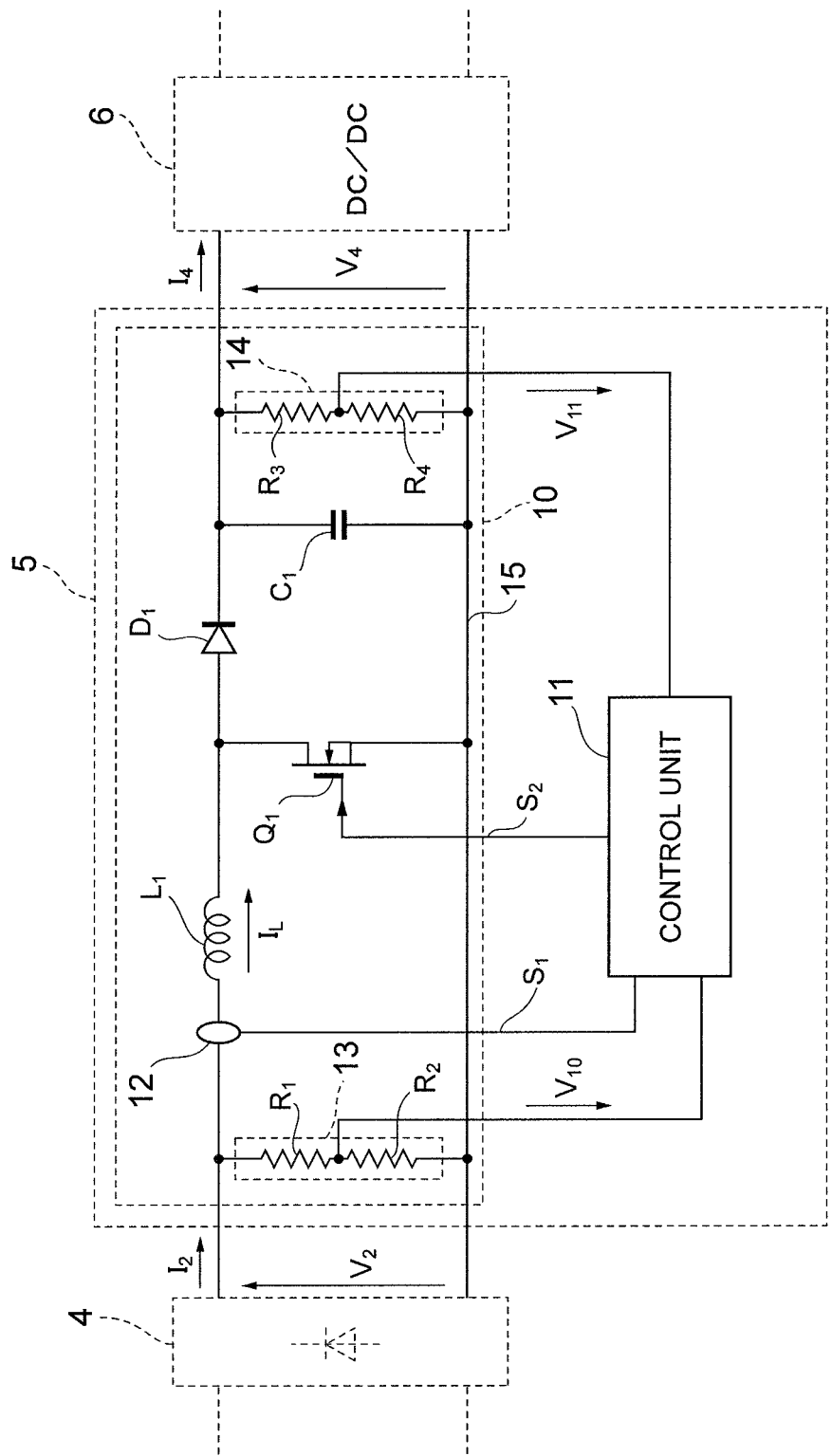
FIG. 3 is a circuit diagram showing a configuration of the PFC circuit according to the first embodiment.

Here, the PFC unit 5 is configured from a PFC circuit 10 and a control unit 11 as shown in FIG. 3.

The PFC circuit 10 comprises a choke coil $L_1$ and a reflux output diode $D_1$ which are connected serially between a positive-side output terminal of the full wave rectification unit 4 and a positive-side input terminal of the DC/DC conversion unit 6, and a switching element $Q_1$ is connected between a connection midpoint of the choke coil $L_1$ and the reflux output diode $D_1$, and a ground line 15 for connecting a negative-side output terminal of the full wave rectification unit 4 and a negative-side input terminal of the DC/DC conversion unit 6.

The switching element $Q_1$ is configured, for example, from a MOS-FET (Metal-Oxide-Semiconductor Field-Effect Transistor), a drain is connected to the connection midpoint of the choke coil $L_1$ and the reflux output diode $D_1$, and a source is connected to the ground line 15. Moreover, a gate of the switching element $Q_1$ is connected to the control unit 11.

Moreover, an output smoothing capacitor $C_1$ is connected between the connection midpoint of the reflux output diode $D_1$ and the positive-side input terminal of the DC/DC conversion unit 6, and the ground line 15.

In addition, a current detector 12 for detecting the coil current $I_L$ that is generated in the choke coil $L_1$ based on the ON/OFF operation of the switching element $Q_1$ is provided between the positive-side output terminal of the full wave rectification unit 4 and the choke coil $L_1$. The current detector 12 sends the detected coil current $I_L$ as a coil current detection signal $S_1$ to the control unit 11. As the current detector, for example, used may be a shunt resistor, a hall element or the like.

In addition, a first partial pressure resistor 13 configured from first and second partial pressure resistors $R_1$, $R_2$ is connected between the positive-side output terminal and the negative-side output terminal of the full wave rectification unit 4. The first partial pressure resistor 13 divides the pulsating voltage $V_2$ output from the full wave rectification unit 4 at a ratio according to the respective resistance values of the first and second partial pressure resistors $R_1$, $R_2$, and outputs the thus obtained first partial pressure voltage $V_{10}$ to the control unit 11.

Meanwhile, a second partial pressure resistor 14 configured from third and fourth partial pressure resistors $R_3$, $R_4$ is connected between the connection midpoint of the reflux output diode $D_1$ and the output smoothing capacitor $C_1$, and the ground line 15. The second partial pressure resistor 14 divides the output voltage $V_4$ output from the PFC unit 5 to the DC/DC conversion unit 6 according to a ratio of the respective resistance values of the third and fourth partial pressure resistors $R_3$, $R_4$, and outputs the thus obtained second partial pressure voltage $V_{11}$ to the control unit 11.

Figure 7:
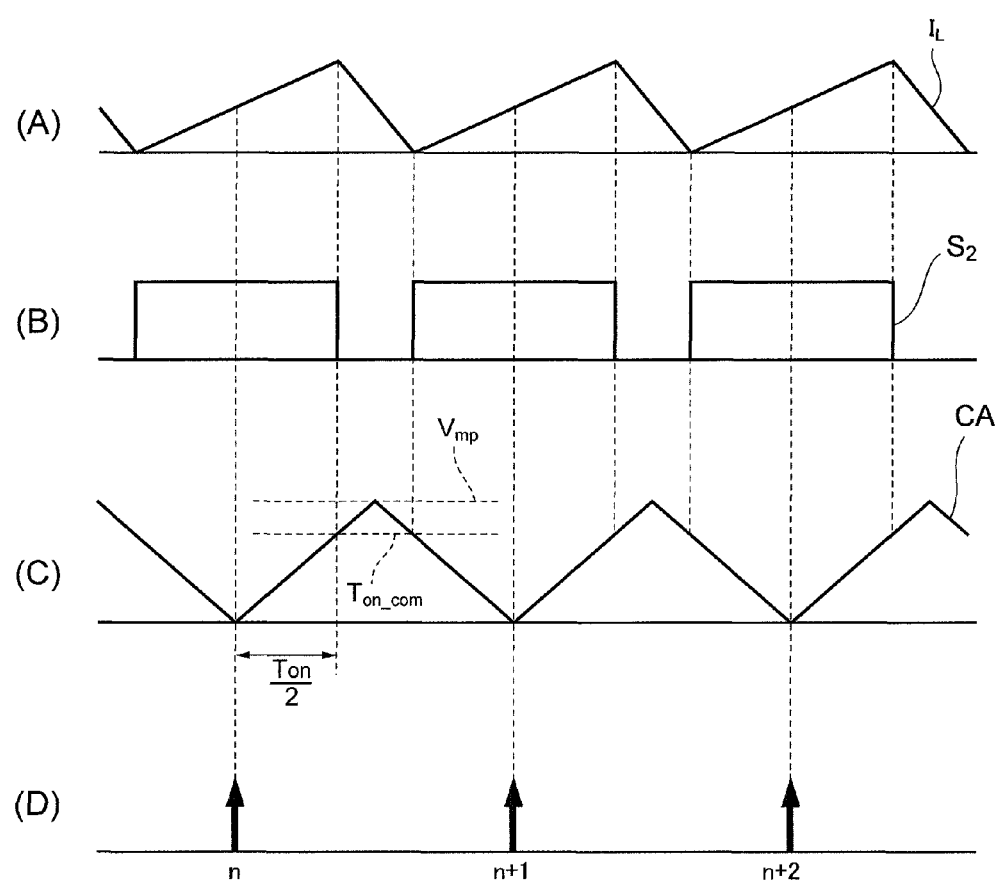
FIG. 7 is a waveform diagram explaining the operation of the PFC circuit according to the first embodiment.

The control unit 11 generates a PWM (Pulse Width Modulation) signal $S_2$ as shown in FIG. 7(B) as a drive signal of the switching element $Q_1$ based on the coil current detection signal $S_1$ provided from the current detector 12, the first partial pressure voltage $V_{10}$ provided from the first partial pressure resistor 13, and the second partial pressure voltage $V_{11}$ provided from the second partial pressure resistor 14, and applies the generated PWM signal $S_2$ to the gate of the switching element $Q_1$.

In the foregoing configuration, in the PFC unit 5, the input voltage $V_2$ provided from the full wave rectification unit 4 is applied to the choke coil $L_1$ of the PFC circuit 10, and, here, in the PFC circuit 10, the switching element $Q_1$ is subject to the ON/OFF operation based on the PWM signal $S_2$ provided from the control unit 11, and the choke coil $L_1$ is generated in the coil current $I_L$ in a critical mode as shown in FIG. 2(C) pursuant to the ON/OFF operation of the switching element $Q_1$.

Subsequently, the coil current $I_L$ and the choke coil terminal voltage (drain-source voltage of $Q_1$) are subject to smoothing processing in the reflux output diode $D_1$ and the output smoothing capacitor $C_1$, and thereafter output to the DC/DC conversion unit 6.

(1-3) Configuration of Control Unit

The configuration of the control unit 11 of the PFC unit 5 is now explained. Prior to such explanation, the principle of the PFC control that is executed by the control unit 11 is foremost explained.

(1-3-1) Principle of PFC Control of Present Embodiment

Figure 4:
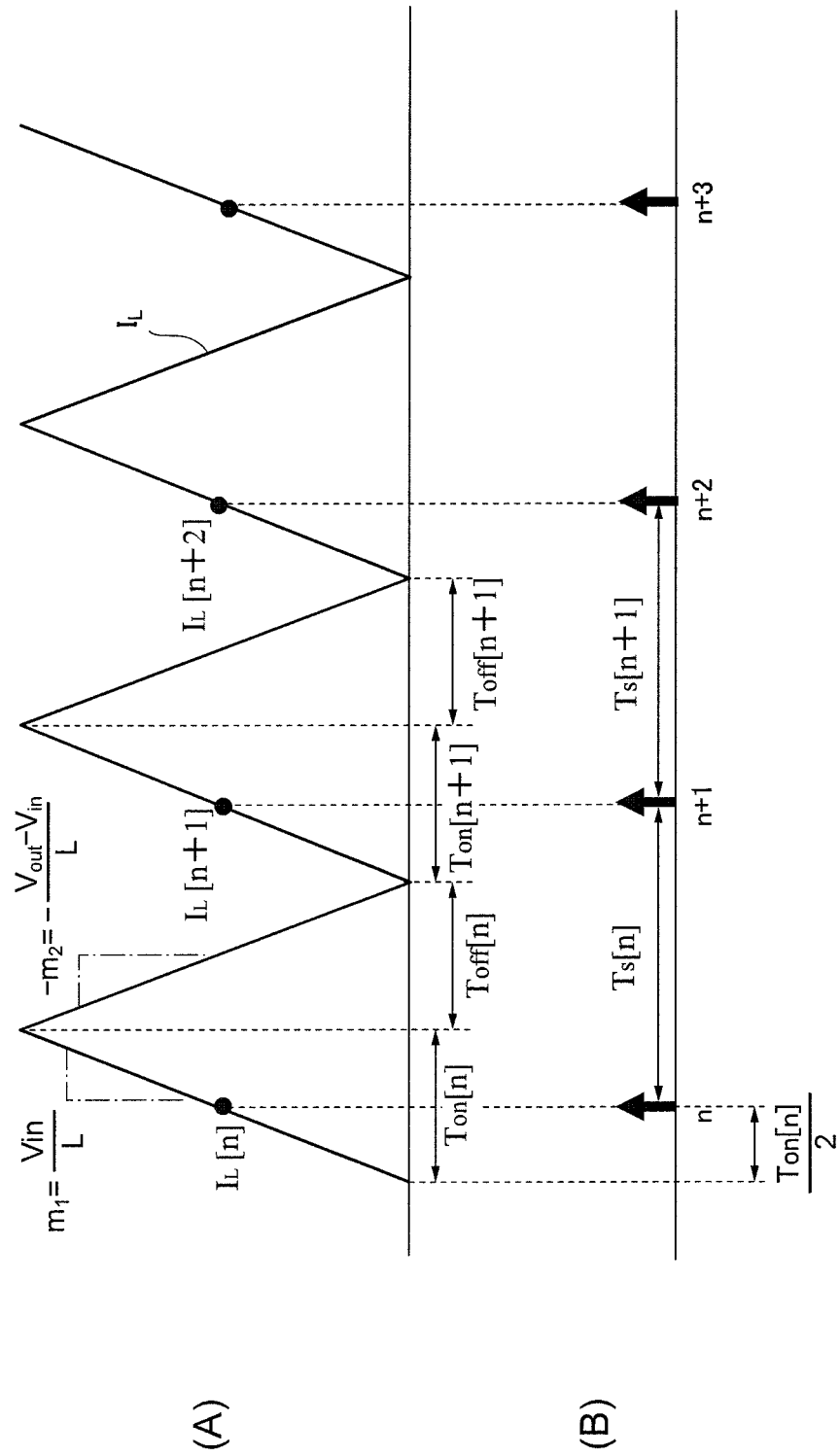
FIG. 4 is a waveform diagram explaining the principle of the PFC control according to the first embodiment.

In FIG. 4, FIG. 4(A) shows the coil current $I_L$ that is generated in the choke coil $L_1$, and FIG. 4(B) shows the sampling timing in the sampling processing to be executed by the control unit 11 for performing digital control. Specifically, FIG. 4(B) illustrates a case of sampling the coil current $I_L$ at a timing in which half of the ON time of the switching element $Q_1$ has elapsed for each sampling period.

Here, if the PFC control is stable (steady), the (n+1)-th ON time $T_{on}[n+1]$ of the switching element $Q_1$ can be assumed to be approximately the same as the ON time $T_{on}[n]$ of the previous sampling, and the following formula is realized.

[Formula 1]

$$T_{on}[n+1] = T_{on}[n] \quad (1)$$

Moreover, since the switching frequency for the PFC control is extremely high in comparison to the frequency of the commercial AC, the following formula is realized between the n-th switching cycle $T_S[n]$ of the switching element $Q_1$ and the (n+1)-th switching cycle $T_S[n+1]$.

[Formula 2]

$$T_S[n+1] \cong T_S[n] \quad (2)$$

Accordingly, based on Formula (1) and Formula (2) above, the following formula is realized between the n-th OFF time $T_{off}[n]$ of the switching element $Q_1$ and the (n+1)-th OFF time $T_{off}[n+1]$.

[Formula 3]

$$T_{off}[n+1] \cong T_{off}[n] \quad (3)$$

Moreover, in a state where the PFC unit 5 is operating stably in the critical mode, as also evident from FIG. 4, the following formula is realized.

[Formula 4]

$$I_L[n] + m_1 \frac{T_{on}[n]}{2} - m_2 T_{off}[n] = 0 \quad (4)$$

Note that, in Formula (4) above, $m_1$ represents rate of increase (inclination at the ON time $T_{on}[n]$ of the waveform of FIG. 4) of the coil current $I_L$ at the n-th ON time $T_{on}[n]$, and $m_2$ represents the rate of decrease (portion in which "−" is excluded from the inclination at the OFF time $T_{off}[n]$ of the waveform of FIG. 4) of the coil current $I_L$ at the operation time (this is hereinafter referred to as the "OFF time") $T_{off}[n]$ of the n-th OFF operation. Moreover, $I_L[n]$ represents the actual value of the coil current $I_L$ at the n-th sampling timing.

If Formula (4) is solved regarding $T_{off}[n]$, the following formula is obtained.

[Formula 5]

$$T_{off}[n] = \frac{1}{m_2} I_L[n] + \frac{m_1}{2m_2} T_{on}[n] \quad (5)$$

In addition, as described above with reference to Formula (3), the n-th OFF time $T_{off}[n]$ and the (n+1)-th OFF time $T_{off}[n+1]$ are considered to be approximately the same. Thus, the (n+1)-th OFF time $T_{off}[n+1]$ can be represented with the following formula by using Formula (5).

[Formula 6]

$$T_{off}[n+1] = \frac{1}{m_2} I_L[n] + \frac{m_1}{2m_2} T_{on}[n] \quad (6)$$

Accordingly, since the (n+1)-th switching cycle $T_S[n+1]$ is obtained by adding the n-th ON time $T_{on}[n]$ to Formula (6) above, it can be represented with the following formula.

[Formula 7]

$$T_S[n+1] \cong \frac{1}{m_2} I_L[n] + \left(1 + \frac{m_1}{2m_2}\right) T_{on}[n] \quad (7)$$

Meanwhile, the rate of increase $m_1$ of the coil current $I_L$ at the n-th ON time $T_{on}[n]$ described above can be represented with the following formula.

[Formula 8]

$$m_1 = \frac{\hat{V}_{in} \sin \omega t}{L} = \frac{V_{in}[n]}{L} \quad (8)$$

Moreover, the rate of decrease $m_2$ of the coil current $I_L$ at the n-th OFF time $T_{off}[n]$ can be represented with the following formula.

[Formula 9]

$$m_2 = \frac{V_{out} - \hat{V}_{in} \sin \omega t}{L} = \frac{V_{out}[n] - V_{in}[n]}{L} \quad (9)$$

However, in Formula (8) and Formula (9), $V_{in}$ with "^" shows the actual peak value of the input voltage $V_2$ that is provided from the full wave rectification unit 4 to the PFC unit 5, $V_{in}[n]$ shows the actual value of the input voltage $V_2$ at the n-th sampling timing, L shows the inductance value of the choke coil $L_1$, and $V_{out}[n]$ shows the actual value at the n-th sampling timing of the output voltage $V_4$ that is output from the PFC unit 5 to the DC/DC conversion unit 6, respectively.

Based on Formula (6), Formula (8) and Formula (9) above, the OFF time $T_{off}[n+1]$ during the (n+1)-th OFF operation can be predicted with the following formula.

[Formula 10]

$$T_{off}[n+1] = \frac{L}{V_{out}[n] - V_{in}[n]} \cdot I_L[n] + \frac{V_{in}[n]}{2(V_{out}[n] - V_{in}[n])} \cdot T_{on}[n] \quad (10)$$

The (n+1)-th switching cycle $T_S[n+1]$ in the foregoing case can be represented with the following formula based on Formula (7) to Formula (9).

[Formula 11]

$$T_s[n+1] = \frac{L}{V_{out}[n] - V_{in}[n]} I_L[n] + \left[1 + \frac{V_{in}[n]}{2(V_{out}[n] - V_{in}[n])}\right] \cdot T_{on}[n] \quad (11)$$

Accordingly, by controlling the OFF time of the switching element $Q_1$ so that the switching cycle satisfies Formula (11) (that is, by controlling the OFF time of the switching element $Q_1$ to satisfy Formula (10)), the PFC control can be performed in a critical mode without having to use a zero voltage detection circuit.

(1-3-2) Specific Configuration of Control Unit

Figure 5:
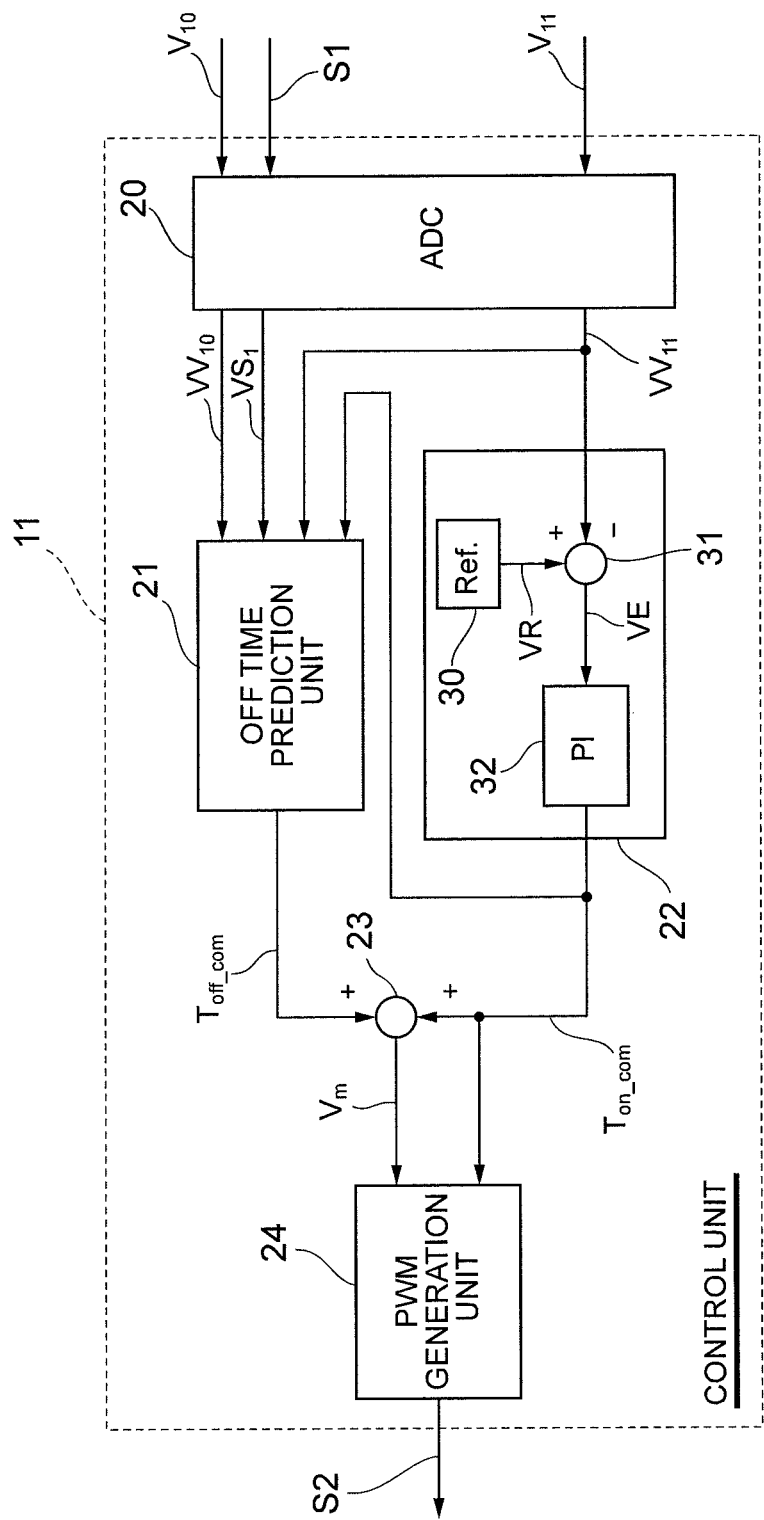
FIG. 5 is a block diagram showing a configuration of the control unit according to the first embodiment.

FIG. 5 shows the specific configuration of the control unit 11 that was created in consideration of the foregoing points. As evident from FIG. 5, the control unit 11 is configured from an analog/digital conversion unit 20, an OFF time prediction unit 21, an ON time control unit 22, an adding circuit 23 and a PWM generation unit 24.

The analog/digital conversion unit 20 samples (analog/digital converts) the first partial pressure voltage $V_{10}$ provided from the first partial pressure resistor 13 (FIG. 3) and the coil current detection signal $S_1$ provided from the current detector 12 (FIG. 3), respectively, at a timing in which half of the ON time has elapsed, based on a notification from the carrier generation unit 33 (FIG. 6) of the PWM generation unit 24 as described later.

The analog/digital conversion unit 20 sends the first partial pressure voltage value $W_{10}$ as the sampled value of the first partial pressure voltage $V_{10}$ and the coil current detection value $VS_1$ as the sampled value of the coil current detection signal $S_1$, which were obtained with the foregoing sampling, to the OFF time prediction unit 21, respectively.

Moreover, the analog/digital conversion unit 20 samples the second partial pressure voltage $V_{11}$ provided from the second partial pressure resistor 14 (FIG. 3) at the same timing as the first partial pressure voltage $V_{10}$ and the coil current detection signal $S_1$, and sends the thus obtained second partial pressure voltage value $W_{11}$ as the sampled value of the second partial pressure voltage $V_{11}$ to the OFF time prediction unit 21 and the ON time control unit 22.

The ON time control unit 22 is configured from a reference value output circuit 30, a subtraction circuit 31 and a PI control unit 32, and inputs the second partial pressure voltage value $VV_{11}$ provided from the analog/digital conversion unit 20 to the negative-side input port of the subtraction circuit 31.

Here, the reference voltage value VR to be taken by the second partial pressure voltage value $VV_{11}$ when a default voltage is output from the PFC unit 5 is provided from the reference value output circuit 30 to the positive-side input port of the subtraction circuit 31. Consequently, the subtraction circuit 31 subtracts the second partial pressure voltage value $VV_{11}$ from the reference voltage value VR, and sends the obtained value as an error value VE to the PI control unit 32.

The PI control unit 32 calculates the target value of the ON time in the subsequent sampling period according to the PI control based on the error value VE that is provided from the subtraction circuit 31, and sends this as the ON time command value $T_{on\_com}$ to the OFF time prediction unit 21, one signal input port of the adding circuit 23, and the PWM generation unit 24, respectively.

The OFF time prediction unit 21 predicts, using foregoing Formula (10), the OFF time for the critical mode control in the subsequent sampling period based on the first partial pressure voltage value $VV_{10}$, the coil current detection value $VS_1$ and the second partial pressure voltage value $W_{11}$ provided from the analog/digital conversion unit 20, and the ON time command value $T_{on\_com}$ provided from the ON time control unit 22.

Specifically, the OFF time prediction unit 21 calculates the voltage value (corresponds to $V_{in}[n]$ of Formula (10)) of the input voltage $V_2$ that is provided from the full wave rectification unit 4 (FIG. 1) to the PFC unit 5 based on the first partial pressure voltage value $W_{10}$, and additionally calculates the current value (corresponds to $I_L[n]$ of Formula (10)) of the coil current $I_L$ based on the coil current detection value $VS_1$. Moreover, the OFF time prediction unit 21 calculates the voltage value (corresponds to $V_{out}[n]$ of Formula (10)) of the output voltage $V_4$ that is output from the PFC unit 5 to the DC/DC conversion unit 6 (FIG. 1) based on the second partial pressure voltage value $W_{11}$.

The OFF time prediction unit 21 thereby calculates the OFF time (corresponds to $T_{off}[n+1]$ of Formula (10)) of the subsequent sampling period according to Formula (10) based on the thus obtained voltage value of the input voltage $V_2$, the coil current value $I_L$, the voltage value of the output voltage $V_4$, and the ON time command value $T_{on\_com}$ (corresponds to $T_{on}[n]$ of Formula (10)) provided from the ON time control unit 22. Note that the inductance L of the choke coil $L_1$ is provided to the OFF time prediction unit 21 in advance, and the OFF time prediction unit 21 stores and retains the inductance L in an internal memory not shown.

Moreover, the OFF time prediction unit 21 outputs the thus obtained prediction value of the OFF time in the subsequent sampling period as the OFF time command value $T_{off\_com}$ to the other signal input port of the adding circuit 23.

The adding circuit 23 calculates the subsequent sampling period that is provided in foregoing Formula (11) by adding the ON time command value $T_{on\_com}$ provided from the ON time control unit 22 and the OFF time command value $T_{off\_com}$ provided from the OFF time prediction unit 21, and sends the calculation result as the sampling period command value $V_m$ to the PWM generation unit 24.

Figure 6:
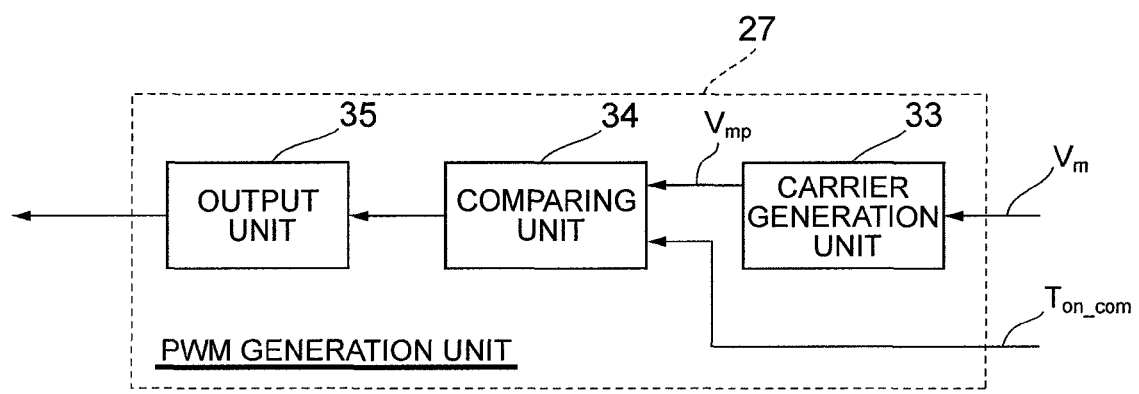
FIG. 6 is a block diagram showing a configuration of the PMW generation unit according to the first embodiment.

The PWM generation unit 24 is configured from a carrier generation unit 33, a comparing unit 34 and an output unit 35 as shown in FIG. 6. The carrier generation unit 33 generates, as shown in FIG. 7(C), a triangle wavelike carrier wave CA with a peak value $V_{mp}$ according to the sampling period command value $V_m$ provided from the adding circuit 23, and sequentially sends the level value of the carrier wave CA to the comparing unit 34 in the internal clock cycle.

Note that, in the case of this embodiment, the carrier generation unit 33 is configured from a counter. The carrier generation unit 33 starts counting from zero, and, while counting up in the internal clock cycle, sequentially sends the count value to the comparing unit 34. Moreover, when the count value reaches the peak value $V_{mp}$, the carrier generation unit 33 thereafter sequentially sends the count value to the comparing unit 34 while counting down. As a result of continuously repeating the foregoing count processing, the carrier generation unit 33 sequentially and continuously generates the carrier wave CA with the peak value $V_{mp}$ according to the sampling period command value $V_m$ provided from the adding circuit 23.

Moreover, the carrier generation unit 33 notifies the timing that the level value (count value) of the carrier wave CA becomes zero (timing of the arrow shown in FIG. 7(D)) to the analog/digital conversion unit 20. Consequently, the analog/digital conversion unit 20 samples the first partial pressure voltage $V_{10}$, the coil current detection signal $S_1$ and the second partial pressure voltage $V_{11}$ at the notified timing.

The comparing unit 34 compares the size of the level value of the carrier wave CA provided from the carrier generation unit 33 in the internal clock cycle and the ON time command value $T_{on\_com}$ provided from the ON time control unit 22 (FIG. 5), and sends the comparative result to the output unit 35.

The output unit 35 subsequently generates a PWM signal $S_2$ as shown in FIG. 7(B) which rises to a high level during the period that the ON time command value $T_{on\_com}$ is higher than the level value of the carrier wave CA and which falls to a low level during the period that the ON time command value $T_{on\_com}$ is lower than the level value of the carrier wave CA based on the comparative result of the comparing unit 34, and sends the generated PWM signal $S_2$ to the gate of the switching element $Q_1$.

Consequently, the switching element $Q_1$ is subject to the ON/OFF operation based on the PWM signal $S_2$, and thereby generates the triangle wavelike coil current $I_L$ as shown in FIG. 7(A) in the choke coil $L_1$.

(1-3-3) Relation of Internal Clock of Control Unit and Peak Value $V_{mp}$ of Carrier Wave The relation of the internal block of the control unit and the peak value $V_{mp}$ of the carrier wave is now explained.

When considering that the portions of the respective triangle shapes of the carrier wave shown in FIG. 7(C) are all isosceles triangles and that the carrier generation unit 33 (FIG. 6) is a counter which counts up or counts down in the internal clock cycle CLK, the peak value $V_{mp}$ of the carrier wave in the n-th sampling period $T_S[n]$ can be represented with the following formula.

[Formula 12]

$$V_{mp}[n] = \frac{CLK \cdot T_s[n]}{2} \quad (12)$$

Note that, in Formula (12), CLK represents the internal clock (for example, 150 MHz) of the control unit.

Moreover, the relation of the ON time command value $T_{on\_com}[n]$ at the n-th sampling period that is output from the ON time control unit 22 and the ON time $T_{on}[n]$ at such n-th sampling period can be represented with the following formula upon referring to FIG. 7(C).

[Formula 13]

$$T_{on\_com}[n] = \frac{CLK \cdot T_{on}[n]}{2} \quad (13)$$

Accordingly, in the case of this embodiment, the peak value $V_{mp}[n+1]$ of the carrier wave in the (n+1)-th sampling period $T_S[n+1]$ can be represented with the following formula by using Formula (11) to Formula (13).

[Formula 14]

$$V_{mp}[n+1] = \frac{CLK \cdot T_s[n+1]}{2}$$
$$= \frac{CLK \cdot L}{2(V_{out}[n] - V_{in}[n])} I_L[n] +$$
$$\left(1 + \frac{V_{in}[n]}{2(V_{out}[n] - V_{in}[n])}\right) \cdot T_{on\_com}[n] \quad (14)$$

(1-4) Effect of Present Embodiment

As described above, with the power supply unit 1 according to this embodiment, the OFF time of the switching element $Q_1$ in the subsequently sampling period in the case of performing the PFC control in the critical mode is predicted based on the pulsating voltage (input voltage $V_2$) to the PFC unit 5 in the previous sampling period, the smoothing voltage (output voltage $V_4$) from the PFC unit 5, the coil current $I_L$, and the ON time of the switching element $Q_1$, and the ON/OFF control of the switching element $Q_1$ is performed based on the prediction result. Thus, the PFC control can be performed in the critical mode without having to use a zero current detection circuit for detecting the zero point of the coil current $I_L$. The circuit size of the PFC unit 5 can thereby be downsized and, consequently, the configuration of the overall power supply unit 1 can be simplified and miniaturized.

Moreover, with the power supply unit 1 according to this embodiment, since the critical mode control can be performed with accuracy based on the foregoing method, the PFC unit 5 can be operated stably. Consequently, the output voltage oscillation or output ripple of the PFC unit 5 can be suppressed, and a stable output can be obtained as the output of the power supply unit 1.

(2) Second Embodiment

(2-1) Configuration of PFC Circuit of Present Embodiment

Figure 8:
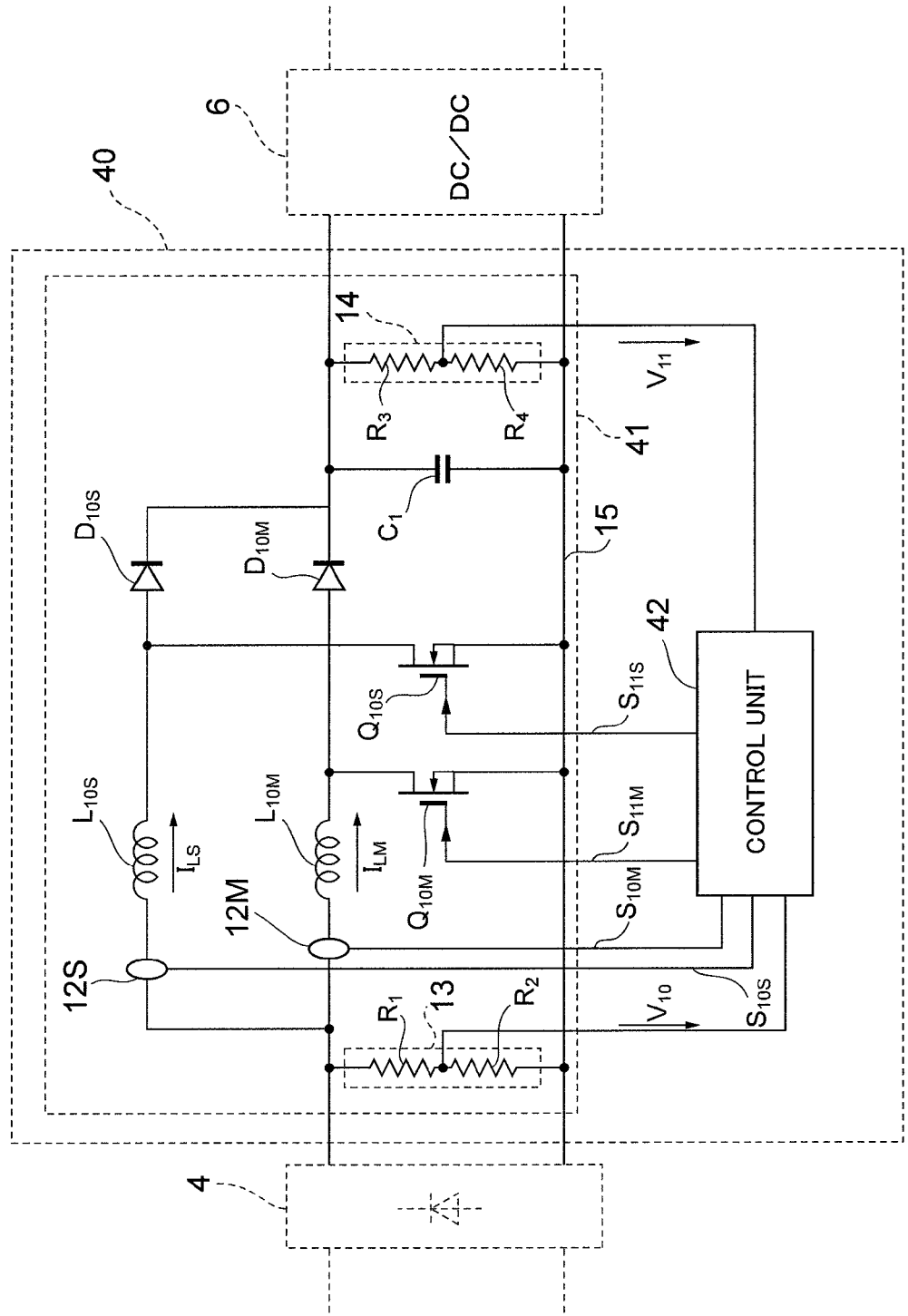
FIG. 8 is a circuit diagram showing a configuration of the PFC circuit according to the second embodiment.

FIG. 8, which uses the same reference numerals for the portions corresponding to FIG. 1, shows a PFC unit 40 according to the second embodiment that is applied to the power supply unit 1 of FIG. 1 in substitute for the PFC unit 5 according to the first embodiment. The PFC unit 40 differs from the PFC unit 5 according to the first embodiment in that a dual interleave system is adopted as the PFC control system.

Specifically, the PFC unit 40 according to this embodiment is configured from a PFC circuit 41 and a control unit 42.

The PFC circuit 41 comprises a master-side choke coil $L_{10M}$ and a master-side reflux output diode $D_{10M}$ which are connected serially between the positive-side output terminal of the full wave rectification unit 4 and the positive-side input terminal of the DC/DC conversion unit 6. Moreover, a master-side switching element $Q_{10M}$ is connected between a connection midpoint of the master-side choke coil $L_{10M}$ and the master-side reflux output diode $D_{10M}$, and the ground line 15.

The master-side switching element $Q_{10M}$ is configured, for example, as with the switching element $Q_1$ of the first embodiment, from a MOS-FET, a drain is connected to the connection midpoint of the master-side choke coil $L_{10M}$ and the master-side rectification output diode $D_{10M}$, and a source is connected to the ground line 15. Moreover, a gate of the master-side switching element $Q_{10M}$ is connected to the control unit 42.

In addition, a master-side current detector 12M for detecting the coil current $I_{LM}$ that is generated in the master-side choke coil $L_{10M}$ based on the ON/OFF operation of the master-side switching element $Q_{10M}$ is provided between the positive-side output terminal of the full wave rectification unit 4 and the master-side choke coil $L_{10M}$. The master-side current detector 12M sends the detected coil current $I_{LM}$ as the master-side coil current detection signal $S_{10M}$ to the control unit 42.

Meanwhile, the PFC circuit 41 is provided with a slave-side choke coil $L_{10S}$ and a slave-side reflux output diode $D_{10S}$, which are connected serially, in parallel with the master-side choke coil $L_{10M}$ and the master-side reflux output diode $D_{10M}$, and a slave-side switching element $Q_{10S}$ is connected between the connection midpoint of the slave-side choke coil $L_{10S}$ and the slave-side rectification output diode $D_{10S}$, and the ground line 15.

The slave-side switching element $Q_{10S}$ is configured, for example, as with the master-side switching element $Q_{10M}$, from a MOS-FET, a drain is connected to the connection midpoint of the slave-side choke coil $L_{10S}$ and the slave-side reflux output diode $D_{10S}$, and a source is connected to the ground line 15. Moreover, a gate of the slave-side switching element $Q_{10S}$ is connected to the control unit 42.

In addition, a slave-side current detector 12S for detecting the coil current $I_{LS}$ that is generated in the slave-side choke coil $L_{10S}$ based on the ON/OFF operation of the slave-side switching element $Q_{10S}$ is provided between the positive-side output terminal of the full wave rectification unit 4 and the slave-side choke coil $L_{10S}$. The slave-side current detector 12S sends the detected coil current $I_{LS}$ as the slave-side coil current detection signal $S_{10S}$ to the control unit 42.

Figure 9:
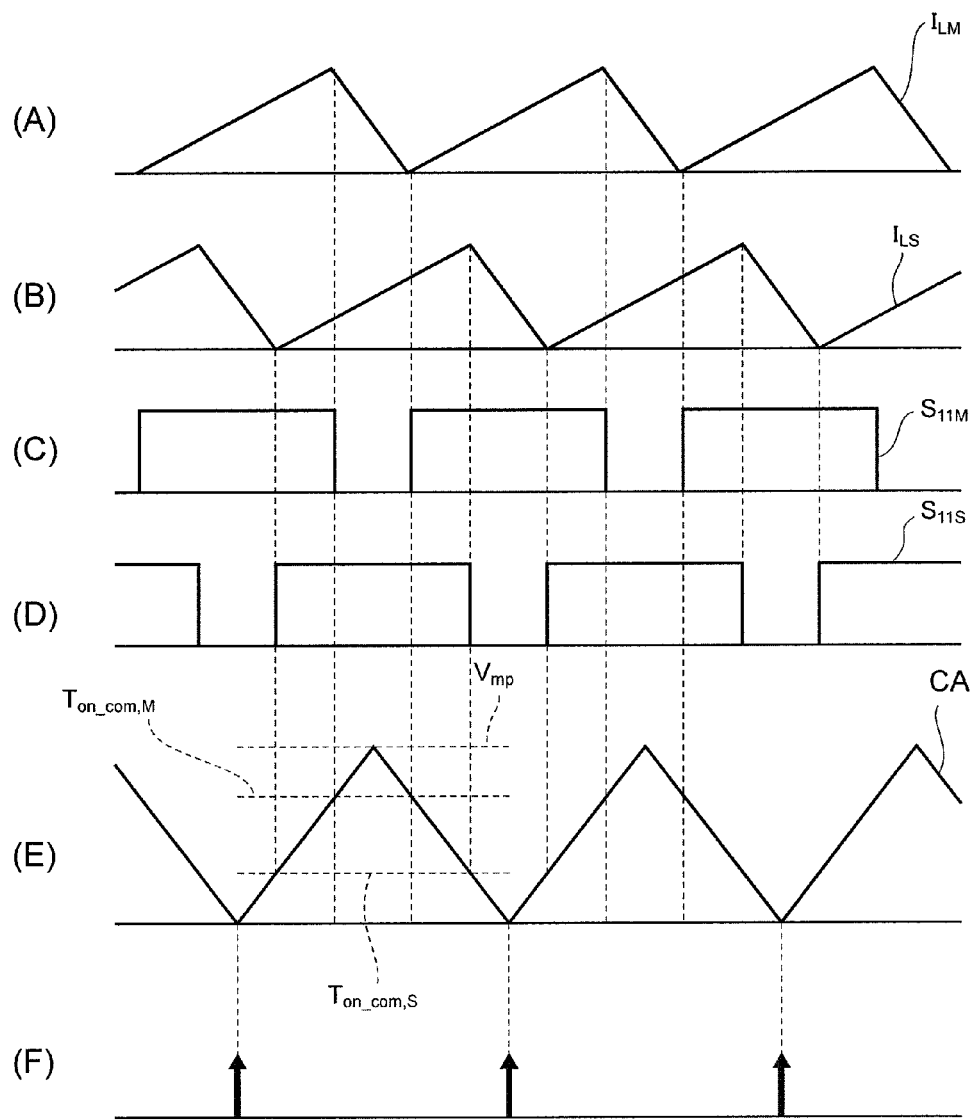
FIG. 9 is a waveform diagram explaining the operation of the PFC circuit according to the second embodiment.

The control unit 42 generates a master-side PWM signal $S_{11M}$ as shown in FIG. 9(C) and a slave-side PWM signal $S_{11S}$ as shown in FIG. 9(D) in which the phase has shifted 180 degrees in relation to the master-side PWM signal $S_{11M}$ based on the master-side coil current detection signal $S_{10M}$ and the slave-side coil current detection signal $S_{10S}$ which are respectively provided from the master-side current detector 12M and the slave-side current detector 12S, the first partial pressure voltage $V_{10}$ provided from the first partial pressure resistor 13, and the second partial pressure voltage $V_{11}$ provided from the second partial pressure resistor 14, applies the master-side PWM signal $S_{11M}$ to the gate of the master-side switching element $Q_{10M}$, and applies the slave-side PWM signal $S_{11M}$ to the gate of the slave-side switching element $Q_{10S}$.

In the foregoing configuration, in the PFC unit 40, the input voltage $V_2$ provided from the full wave rectification unit 4 is applied to the master-side choke coil $L_{10M}$ and the slave-side choke coil $L_{10S}$ of the PFC circuit 41, respectively.

Here, the master-side switching element $Q_{10M}$ is subject to the ON/OFF operation based on the master-side PWM signal $S_{11M}$ provided from the control unit 42, and the master-side coil current $I_{LM}$ of the critical mode as shown in FIG. 9(A) is generated in the master-side choke coil $L_{10M}$ pursuant to the ON/OFF operation of the master-side switching element $Q_{10M}$. Similarly, here, the slave-side switching element $Q_{10S}$ is subject to the ON/OFF operation based on the slave-side PWM signal $S_{11S}$ that is provided from the control unit 42, and the slave-side coil current $I_{LS}$ of the critical mode as shown in FIG. 9(B) is generated in the slave-side choke coil $L_{10S}$ pursuant to the ON/OFF operation of the slave-side switching element $Q_{10S}$.

The master-side coil current $I_{LM}$ and the slave-side coil current $I_{LS}$ are subsequently rectified in the corresponding master-side reflux output diode $D_{10M}$ or the slave-side reflux output diode $D_{10S}$ and thereafter synthesized, and the thus obtained rectification coil signal is smoothed in the output smoothing capacitor $C_1$ and output to the DC/DC conversion unit 6.

(2-2) Configuration of Control Unit (2-2-1) Principle of PFC Control of Present Embodiment Meanwhile, in the PFC control according to the foregoing interleave system, it is necessary to cause the current distribution of the master-side and the slave-side to be equal. In other words, as shown in FIG. 10(A), the phase difference between the master-side coil current $I_{LM}$ generated in the master-side choke coil $L_{10M}$ and the slave-side coil current $I_{LS}$ generated in the slave-side choke coil $L_{10S}$ must be accurately 180 degrees. Note that the arrow of FIG. 10(B) shows the timing of sampling that is executed in the control unit 42 in order to perform digital control.

Nevertheless, due to differences in the characteristics between the respective parts of the master-side (choke coil, switching element and the like) and the corresponding parts of the slave-side, there are cases where the phase difference between the master-side coil current $I_{LM}$ and the slave-side coil current $I_{LS}$ does not accurately become 180 degrees. In the foregoing case, the current ratio of the master-side and the slave-side will collapse and stress of the parts will be applied to either the master-side or the slave-side, and, in a worst case scenario, the control will become unstable.

Here, FIG. 11(A) shows an example where the phase difference between the master-side coil current $I_{LM}$ generated in the master-side choke coil $L_{10M}$ and the slave-side coil current $I_{LS}$ generated in the slave-side choke coil $L_{10S}$ deviates from 180 degrees. Moreover, FIG. 11(B) shows the timing of the sampling that is executed in the control unit 42 for performing digital control.

Figure 10:
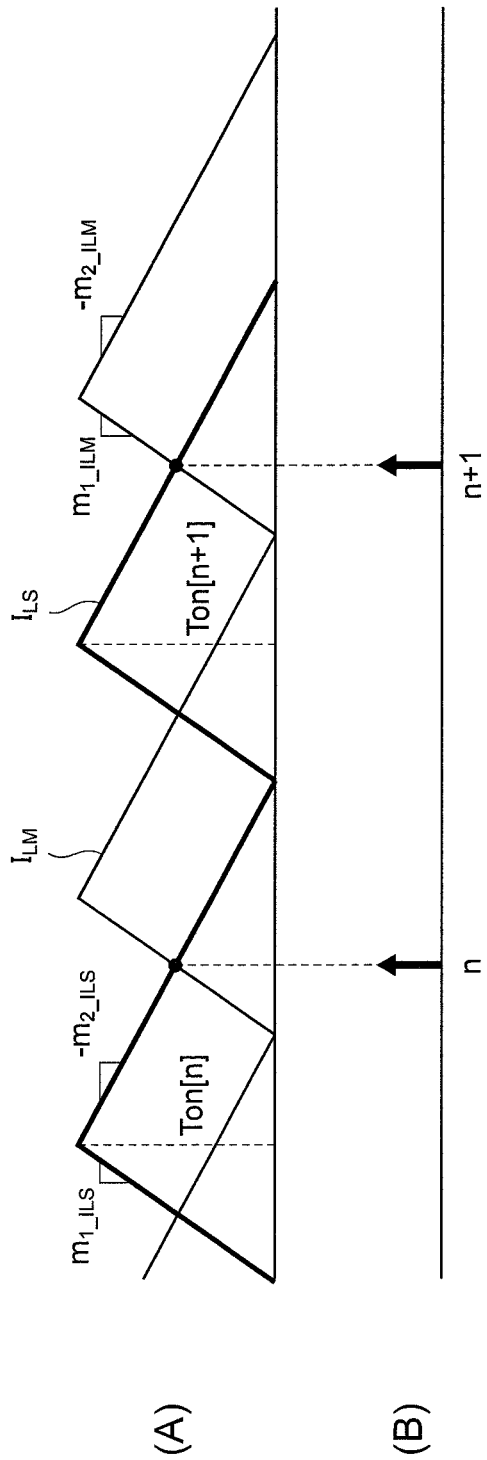
FIG. 10 is a waveform diagram explaining the principle of the PFC control according to the second embodiment.
Figure 11:
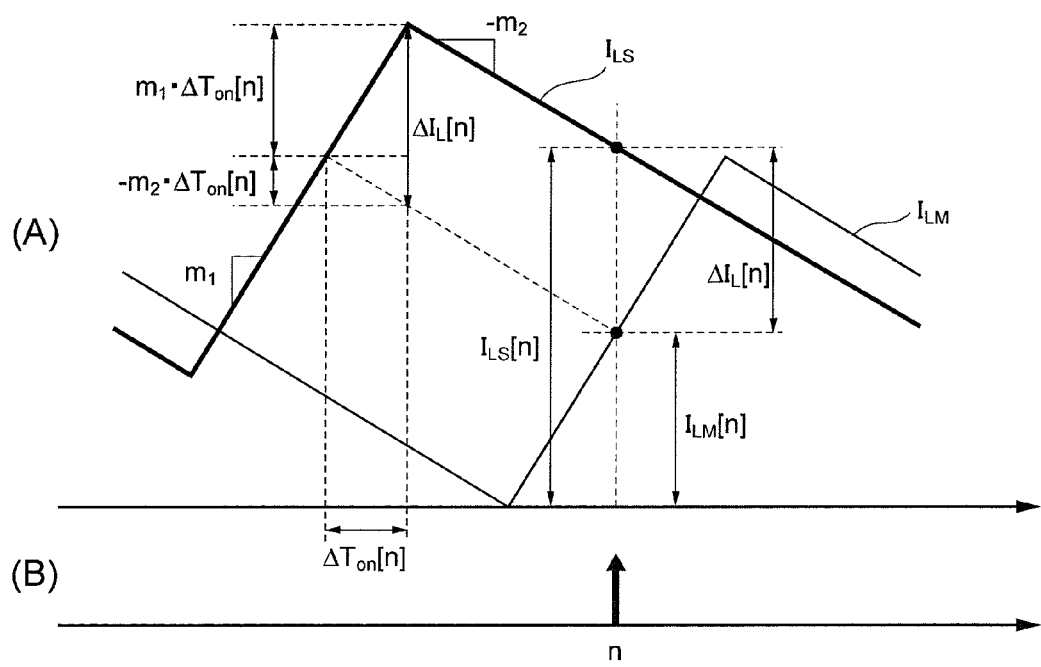
FIG. 11 is a waveform diagram explaining the principle of the PFC control according to the second embodiment.

In FIG. 11(A), the following formula is hypothesized with the rate of increase (inclination of the corresponding straight line of FIG. 11) of the master-side coil current $I_{LM}$ in the period that the master-side coil current $I_{LM}$ increases as $m_{1\_ILM}$ (refer to FIG. 10), and the rate of increase (inclination of the corresponding straight line of FIG. 11) of the slave-side coil current $I_{LS}$ in the period that the slave-side coil current $I_{LS}$ increases as $m_{1\_ILS}$ (refer to FIG. 10).

[Formula 15]

$$m_{1\_ILM} \cong m_{1\_ILS} = m_1 \qquad (15)$$

Moreover, in FIG. 11(A), the following formula is hypothesized with the rate of decrease (inclination of the corresponding straight line of FIG. 11) of the master-side coil current $I_{LM}$ in the period that the master-side coil current $I_{LM}$ decreases as $-m_{2\_ILM}$ (refer to FIG. 10), and the rate of decrease (inclination of the corresponding straight line of FIG. 11) of the slave-side coil current $I_{LS}$ in the period that the slave-side coil current $I_{LS}$ decreases as $-m_{2\_ILS}$ (refer to FIG. 10).

[Formula 16]

$$m_{2\_ILM} \cong m_{2\_ILS} = m_2 \qquad (16)$$

In addition, upon referring to FIG. 11(A), the following formula is realized.

[Formula 17]

$$|-m_2 \cdot \Delta T_{on}[n]| + m_1 \cdot \Delta T_{on}[n] = \Delta I_L[n] \qquad (17)$$

Note that, in Formula (17), $\Delta T_{on}[n]$ shows the temporal shift from the correct timing of the ON time $T_{on}[n]$ of the slave-side coil current $I_{LS}$ in the case of FIG. 11(A). Moreover, $\Delta I_L[n]$ shows the level difference between the master-side coil current $I_{LM}$ and the slave-side coil current $I_{LS}$ at the n-th sampling timing (arrow of FIG. 11(B)) in the case of FIG. 11(A).

Here, upon solving Formula (17) above regarding temporal shift $\Delta T_{on}[n]$, the following formula is realized.

[Formula 18]

$$\Delta T_{on}[n] = \frac{\Delta I_L[n]}{m_2 + m_1} \qquad (18)$$

Formula (18) can be modified as the following formula based on Formula (8) and Formula (9) above.

[Formula 19]

$$\Delta T_{on}[n] = \frac{\Delta I_L[n]}{m_2 + m_1} = \frac{L}{V_{out}} \cdot (I_{LS}[n] - I_{LM}[n]) \qquad (19)$$

In Formula (19), $I_{LM}[n]$ shows the value of the master-side coil current $I_{LM}$ at the n-th sampling timing (arrow of FIG. 11(B)), and $I_{LS}[n]$ shows the value of the slave-side coil current $I_{LS}$ at the n-th sampling timing.

Accordingly, as a result of adding the temporal shift $\Delta T_{on}[n]$ represented with Formula (19) to the slave-side ON time command value, it is possible to obtain the slave-side ON time command value (hereinafter referred to as the "slave-side ON time command value") $T_{on\_com,S}$ in which the phase difference between the master-side coil current $I_{LM}$ and the slave-side coil current $I_{LS}$ has been corrected to be accurately 180 degrees. Note that the slave-side ON time command value $T_{on\_com,S}$ can be represented with the following formula with the sampling period designated value as $V_m$, and the master-side ON time command value (hereinafter referred to as the "master-side ON time command value") as $T_{on\_com,M}$.

[Formula 20]

$$T_{on\_com,S}[n] = V_m[n] - T_{on\_com,M}[n] + \Delta T_{on}[n-1] \quad (20)$$

(2-2-2) Configuration of Control Unit

Figure 12:
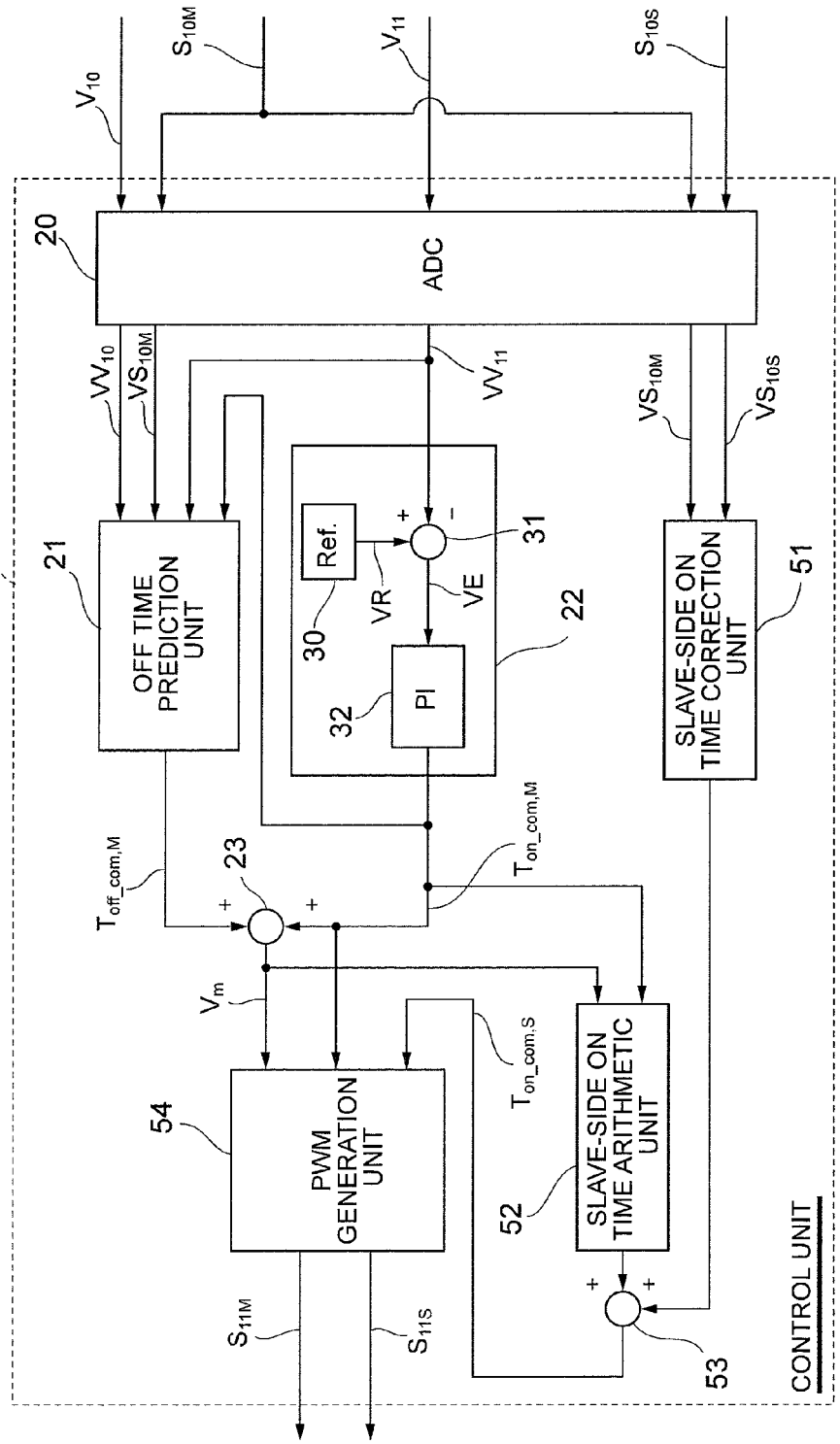
FIG. 12 is a block diagram showing a configuration of the control unit according to the second embodiment.

FIG. 12, which uses the same reference numerals for the portions corresponding to FIG. 5, shows the configuration of the control unit 42 according to the second embodiment that was configured in consideration of the foregoing points. The control unit 42 comprises, as with the control unit 11 (FIG. 5) according to the first embodiment, an analog/digital conversion unit 20, an OFF time prediction unit 21, an ON time control unit 22, an adding circuit 23 and a PWM generation unit 54. Moreover, the control unit 42 according to this embodiment comprises, in addition to the foregoing configuration, a slave-side ON time correction unit 51, a slave-side ON time arithmetic unit 52 and an adding circuit 53.

The analog/digital conversion unit 20 analog-digital converts the first partial pressure voltage $V_{10}$ provided from the first partial pressure resistor 13 (FIG. 8) and the master-side coil current detection signal $S_{10M}$ provided from the master-side current detector 12M (FIG. 8), respectively, based on a notification that is provided from the carrier generation unit 33 (FIG. 13) of the PWM generation unit 54 as described later.

The analog/digital conversion unit 20 sends the first partial pressure voltage value $VV_{10}$ as the sampled value of the first partial pressure voltage $V_{10}$ obtained with the foregoing sampling to the OFF time prediction unit 21, and sends the master-side coil current detection value $VS_{10M}$ as the sampled value of the master-side coil current detection signal $S_{10M}$ to the OFF time prediction unit 21 and the slave-side ON time correction unit 51.

Moreover, the analog/digital conversion unit 20 samples the second partial pressure voltage $V_{11}$ provided from the second partial pressure resistor 14 (FIG. 8) at the same timing as the first partial pressure voltage $V_{10}$ and the master-side coil current detection signal $S_{10M}$, and sends the thus obtained second partial pressure voltage value $VV_{11}$ as the sampled value of the second partial pressure voltage $V_{11}$ to the OFF time prediction unit 21 and the ON time control unit 22.

In addition, the analog/digital conversion unit 20 analog/digital converts the slave-side coil current detection signal $S_{10S}$ provided from the slave-side current detector 12S (FIG. 8), and sends the thus obtained slave-side coil current detection value $VS_{10S}$ to the slave-side ON time correction unit 51.

The ON time control unit 22, as with the first embodiment, calculates the target value of the ON time of the master-side in the subsequent sampling period, and outputs this as the master-side ON time command value $T_{on\_com,M}$ to the OFF time prediction unit 50, one signal input port of the adding circuit 23, the PWM generation unit 54 and the slave-side ON time arithmetic unit 52, respectively.

The OFF time prediction unit 21 predicts, using foregoing Formula (10), the OFF time of the master-side for performing the critical mode control in the subsequent sampling period based on the first partial pressure voltage value $W_{10}$, the master-side coil current detection value $VS_{10M}$ and the second partial pressure voltage value $VV_{11}$ provided from the analog/digital conversion unit 20, and the master-side ON time command value $T_{on\_com,M}$ provided from the ON time control unit 22. The OFF time prediction unit 50 thereafter outputs the thus obtained prediction value of the OFF time of the master-side in the subsequent sampling period as the master-side OFF time command value $T_{off\_com,M}$ to the other signal input port of the adding circuit 23.

The adding circuit 23 calculates the sampling period provided in Formula (11) by adding the master-side ON time command value $T_{on\_com,M}$ provided from the ON time control unit 22, and the master-side OFF time command value $T_{off\_com,M}$ provided from the OFF time prediction unit, and sends the calculation result as the sampling period command value $V_m$ to the PWM generation unit 54 and the slave-side ON time arithmetic unit 52, respectively.

The slave-side ON time correction unit 51 calculates the foregoing slave-side ON time correction value $\Delta T_{on}[n]$ explained with reference to Formula (19) based on the master-side coil current detection value $VS_{10M}$ and the slave-side coil current detection value $VS_{10S}$ provided from the analog/digital conversion unit 20, and sends the obtained slave-side ON time correction value $\Delta T_{on}[n]$ to one signal input port of the adding circuit 53.

Moreover, here, the slave-side ON time arithmetic unit 52 calculates the slave-side ON time command value based on the master-side ON time command value $T_{on\_com,M}$ provided from the ON time control unit 22, and the sampling period command value $V_m$ provided from the adding circuit 23, and sends the ON time command value to the other signal input port of the adding circuit 53.

The adding circuit 53 generates the slave-side ON time command value $T_{on\_com,S}$ provided in Formula (20) above subject to phase compensation by adding the slave-side ON time correction value $\Delta T_{on}$ provided from the slave-side ON time correction unit 51 to the ON time command value provided from the slave-side ON time arithmetic unit 52, and sends this to the PWM generation unit 54.

Figure 13:
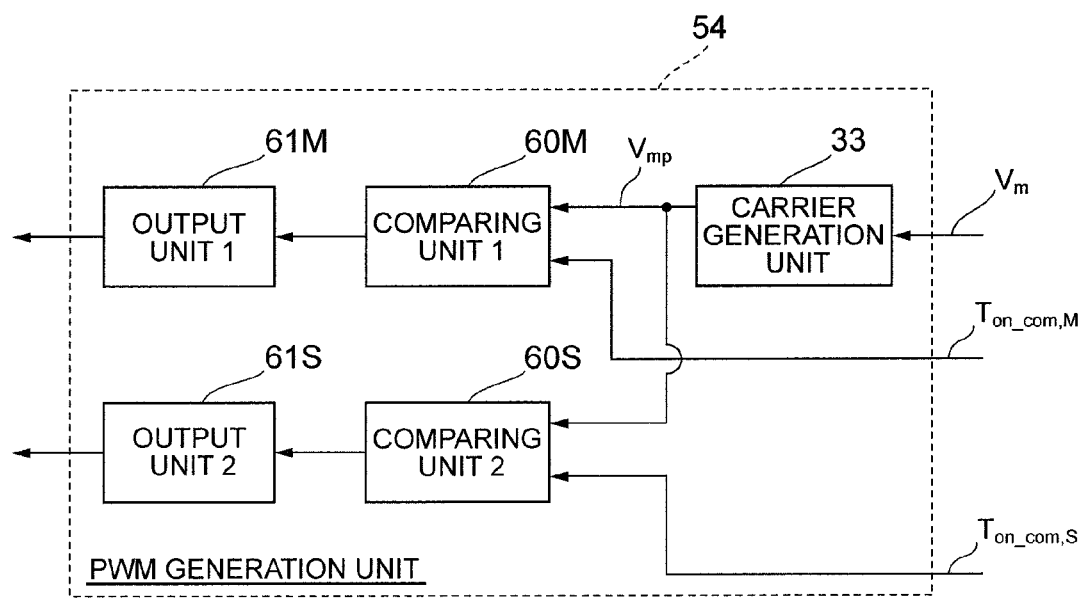
FIG. 13 is a block diagram showing a configuration of the PMW generation unit according to the second embodiment.

The PWM generation unit 54 is configured, as shown in FIG. 13, from a carrier generation unit 33, a master-side comparing unit 60M, a slave-side comparing unit 60S, a master-side output unit 61M and a slave-side output unit 61S.

The carrier generation unit 33, as shown in FIG. 9(E) and as with the first embodiment, generates a triangle wavelike carrier wave CA with a peak value $V_{mp}$ according to the sampling period command value $V_m$ provided from the adding circuit 23, and sequentially sends the level value of the carrier wave CA to the master-side comparing unit 60M and the slave-side comparing unit 60S in the internal clock cycle.

Moreover, the carrier generation unit 33 notifies the timing that the level value (count value) of the carrier wave CA becomes zero (timing of the arrow shown in FIG. 9(F)) to the analog/digital conversion unit 20. Consequently, the analog/digital conversion unit 20 samples the first partial pressure voltage $V_{10}$, the second partial pressure voltage $V_{11}$, the master-side coil current detection signal $S_{10M}$ and the slave-side coil current detection signal $S_{10S}$ at the notified timing.

The master-side comparing unit 60M compares the size of the level value of the carrier wave provided from the carrier generation unit 33 and the master-side ON time command value $T_{on\_com,M}$ provided from the ON time control unit, and sends the comparative result to the master-side output unit 61M.

The master-side output unit 61M subsequently generates a master-side PWM signal $S_{11M}$ as shown in FIG. 9(C) which rises to a high level during the period that the master-side ON time command value $T_{on\_com,M}$ is lower than the level value of the carrier wave and which falls to a low level during the period that the master-side ON time command value $T_{on\_com,M}$ is higher than the level value of the carrier wave based on the comparative result of the master-side comparing unit 60M, and sends the generated master-side PWM signal $S_{11M}$ to the gate of the master-side switching element $Q_{11M}$.

Consequently, the master-side switching element $Q_{11M}$ is subject to the ON/OFF operation based on the master-side PWM signal $S_{11M}$, and the master-side coil current $I_{LM}$ as shown in FIG. 9(A) is generated in the foregoing master-side choke coil $L_{10M}$ pursuant to the ON/OFF operation of the master-side switching element $Q_{11M}$.

Moreover, the slave-side comparing unit 60S compares the size of the level value of the carrier wave provided from the carrier generation unit 33 and the slave-side ON time command value $T_{on\_com,S}$ provided from the slave-side ON time arithmetic unit 52 (FIG. 12), and sends the comparative result to the slave-side output unit 61S.

The slave-side output unit 61S subsequently generates a slave-side PWM signal $S_{11S}$ as shown in FIG. 9(D) which rises to a high level during the period that the slave-side ON time command value $T_{on\_com,S}$ is higher than the level value of the carrier wave and which falls to a low level during the period that the slave-side ON time command value $T_{on\_com,S}$ is lower than the level value of the carrier wave based on the comparative result of the slave-side comparing unit 60S, and sends the generated slave-side PWM signal $S_{11S}$ to the gate of the slave-side switching element $Q_{10S}$.

Consequently, the slave-side switching element $Q_{10S}$ is subject to the ON/OFF operation based on the slave-side PWM signal $S_{11S}$, and the slave-side coil current $I_{LS}$ with a phase difference of 180 degrees from the master-side coil current $I_{LM}$ as shown in FIG. 9(B) is generated in the foregoing slave-side choke coil $L_{10S}$ pursuant to the ON/OFF operation of the slave-side switching element $Q_{10S}$.

(2-3) Effect of Present Embodiment

As described above, the PFC unit 40 according to this embodiment, as with the PFC unit 5 according to the first embodiment, predicts the OFF time of the master-side for performing the critical mode control in the subsequent sampling period based on the first partial pressure voltage value $VV_{10}$, the master-side coil current detection value $VS_{10M}$ and the second partial pressure voltage value $VV_{11}$ provided from the analog/digital conversion unit 20, and the master-side ON time command value $T_{on\_com,M}$ provided from the ON time control unit 22, and additionally corrects the phase of the slave-side PWM signal $S_{S11S}$ in the slave-side ON time correction unit 51 and the slave-side ON time arithmetic unit 52. Thus, the phase of the slave-side PWM signal $_{S11S}$ can be retained with accuracy as a phase difference of 180 degrees in relation to the master-side PWM signal $_{S11M}$.

Consequently, the output voltage oscillation or output ripple of the PFC unit 40 can be suppressed, and a stable output can be obtained as the output of the power supply unit 1.

(2) Other Embodiments

Figure 14:
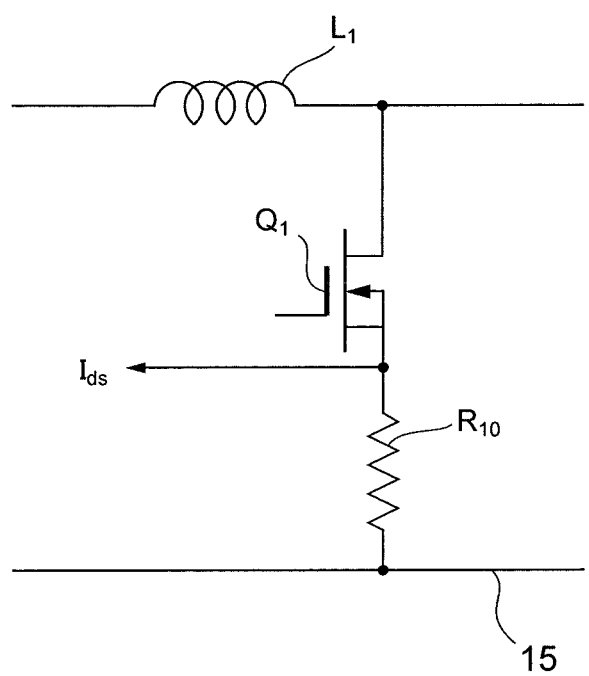
FIG. 14 is a circuit diagram explaining another embodiment.

Although the foregoing first embodiment explained a case of detecting the current value of the coil current IL that is generated in the choke coil L1 with the current detector 12, and performing the PFC control according to the foregoing embodiment based on the detected current value of the coil current IL, the present invention is not limited thereto, and, for example, as shown in FIG. 14, it is also possible to connect a resistor R10 between the source of the switching element Q1 and the ground line 15, acquire an inductor current Ids (drain-source current of Q1) flowing in the switching element Q1 from the connection midpoint of the source of the switching element Q1 and the resistor R10, and perform the PFC control according to the foregoing embodiment based on the inductor current Ids.

This also applied to the second embodiment. However, in the foregoing case, as evident from FIG. 9, sampling is performed at the wave trough of the carrier wave CA, and, as the master-side coil current $I_{LM}$, a value at the rise of the coil current (that is, at a timing that is exactly ½ of the ON period of the master-side PWM signal $S_{11M}$) can be acquired. Meanwhile, the slave-side coil current $I_{LS}$ is sampled at the fall of the coil current. This means that, considering that the inductor current Ids will be a sawtooth current waveform, it will not be possible to detect the current at the fall. Thus, in the foregoing case, if a sample value of only the slave-side current detector 12S is acquired at a timing of a half cycle before (detection of the master-side current is one cycle before) (that is, at the wave crest of the carrier wave CA), the current can be detected at the rise as with the master-side coil current $I_{LM}$.

Moreover, although the foregoing second embodiment explained a case where, in the control unit 42, the phase of the slave-side PWM signal $S_{11S}$ is corrected so that the phase of the slave-side PWM signal $S_{11S}$ is shifted 180 degrees in relation to the master-side PWM signal $S_{11M}$ with the master-side as the reference, the present invention is not limited thereto, and, for example, the phase of the master-side PWM signal $S_{11M}$ may be corrected such as the phase of the slave-side PWM signal $S_{11M}$ is shifted 180 degrees in relation to the slave-side PWM signal $S_{11S}$ with the slave-side as the reference.

In addition, although the foregoing first and second embodiments explained a case of configuring the input voltage detection unit for detecting the input voltage from the first and second partial pressure resistors $R_1$, $R_2$, and configuring the output voltage detection unit for detecting the output voltage from the third and fourth partial pressure resistors $R_3$, $R_4$, the present invention is not limited thereto, and various types of configurations may be broadly applied as the configuration of the input voltage detection unit and the output voltage detection unit.

In addition, although the foregoing first and second embodiments explained a case of predicting the OFF time in the subsequent period based on Formula (10), the present invention is not limited thereto, and the OFF time in the subsequent sampling period may also be predicted using various other computation methods.

What is claimed is:
1. A power factor correction device including a coil and a switching element, and a control unit for controlling ON/OFF of the switching element, comprising:
an input voltage detection unit for detecting an input voltage of the power factor correction device;
an output voltage detection unit for detecting an output voltage; and a coil current detection unit for detecting a coil current that is generated in the coil pursuant to the ON/OFF operation of the switching element, wherein the control unit predicts an OFF time of the switching element of each switching cycle for controlling the switching element in a critical mode based on a voltage value of the input voltage detected with the input voltage detection unit, a voltage value of the output voltage detected with the output voltage detection unit, and a current value of the coil current detected with the coil current detection unit, and controls the ON/OFF of the switching element based on the prediction result, and wherein the control unit predicts an OFF time $T_{off}[n+1]$ of the switching element according to the following formula with the voltage value of the input voltage at the n-th sampling timing as $V_{in}[n]$, the output voltage as $V_{out}[n]$, the current value of the coil current as $I_L[n]$, an ON time of the switching element as $T_{on}[n]$, and inductance of the coil as L:

[Formula 21]

$$T_{off}[n+1] = \frac{L}{V_{out}[n] - V_{in}[n]} \cdot I_L[n] + \frac{V_{in}[n]}{2(V_{out}[n] - V_{in}[n])} \cdot T_{on}[n]. \quad (21)$$

2. The power factor correction device according to claim 1, wherein the coil, the switching element and the coil current detection unit are respectively provided to a master-side and a slave-side, and wherein, based on the voltage value of the input voltage detected with the input voltage detection unit, the voltage value of the output voltage detected with the output voltage detection unit, and the current value of the coil current detected with the one coil current detection unit of the master-side or the slave-side, the control unit predicts an OFF time of the one switching element of the master-side or the slave-side of each switching cycle for controlling the switching element in a critical mode, and controls the ON/OFF of each of the switching elements of the master-side and the slave-side based on the prediction result.

3. The power factor correction device according to claim 2, wherein the switching elements of the master-side and the slave-side are subject to the ON/OFF operation based on a pulse-width modulated drive signal applied from the control unit, and wherein, based on the respective coil currents of the master-side and the slave-side that were detected with the respective coil current detection units of the master-side and the slave-side in a previous sampling period, the control unit corrects a phase of the drive signal to be applied to the other switching element of the slave-side or the master-side so that the other switching element of the slave-side or the master-side is subject to the ON/OFF operation with a phase difference of 180 degrees in relation to the ON/OFF operation of the one switching element of the master-side or the slave-side.

4. A control method of a power factor correction device including a coil and a switching element, and a control unit for controlling ON/OFF of the switching element, wherein the power factor correction device comprises:

an input voltage detection unit for detecting an input voltage of the power factor correction device;

an output voltage detection unit for detecting an output voltage; and a coil current detection unit for detecting a coil current that is generated in the coil pursuant to the ON/OFF operation of the switching element, and wherein the control method comprises:

a first step of the control unit predicting an OFF time of the switching element of each switching cycle for controlling the switching element in a critical mode based on a voltage value of the input voltage detected with the input voltage detection unit, a voltage value of the output voltage detected with the output voltage detection unit, and a current value of the coil current detected with the coil current detection unit; and a second step of the control unit controlling the ON/OFF of the switching element based on the prediction result: and wherein, at the first step, control unit predicts an OFF time $T_{off}[n+1]$ of the switching element according to the following formula with the voltage value of the input voltage at the n-th sampling timing as $V_{in}[n]$, the output voltage as $V_{out}[n]$, the current value of the coil current as $I_L[n]$, an ON time of the switching element as $T_{on}[n]$, and inductance of the coil as L:

[Formula 22]

$$T_{off}[n+1] = \frac{L}{V_{out}[n] - V_{in}[n]} \cdot I_L[n] + \frac{V_{in}[n]}{2(V_{out}[n] - V_{in}[n])} \cdot T_{on}[n]. \quad (22)$$

5. The control method of a power factor correction device according to claim 4, wherein the power factor correction device comprises the coil, the switching element and the coil current detection unit respectively on a master-side and a slave-side, wherein, at the first step, based on the voltage value of the input voltage detected with the input voltage detection unit, the voltage value of the output voltage detected with the output voltage detection unit, and the current value of the coil current detected with the one coil current detection unit of the master-side or the slave-side, the control unit predicts an OFF time of the one switching element of the master-side or the slave-side of each switching cycle for controlling the switching element in a critical mode, and wherein, at the second step, the control unit controls the ON/OFF of each of the switching elements of the master-side and the slave-side based on the prediction result.

6. The control method of a power factor correction device according to claim 5, wherein the switching elements of the master-side and the slave-side are subject to the ON/OFF operation based on a pulse-width modulated drive signal applied from the control unit, and wherein, at the second step, based on the respective coil currents of the master-side and the slave-side that were detected with the respective coil current detection units of the master-side and the slave-side in a previous sampling period, the control unit corrects a phase of the drive signal to be applied to the other switching element of the slave-side or the master-side so that the other switching element of the slave-side or the master-side is subject to the ON/OFF operation with a phase difference of 180 degrees in relation to the ON/OFF operation of the one switching element of the master-side or the slave-side.

\* \* \* \* \*